May 27, 1924.
G. HARFORD
TIRE ARMOR
Filed March 24, 1923
1,495,300
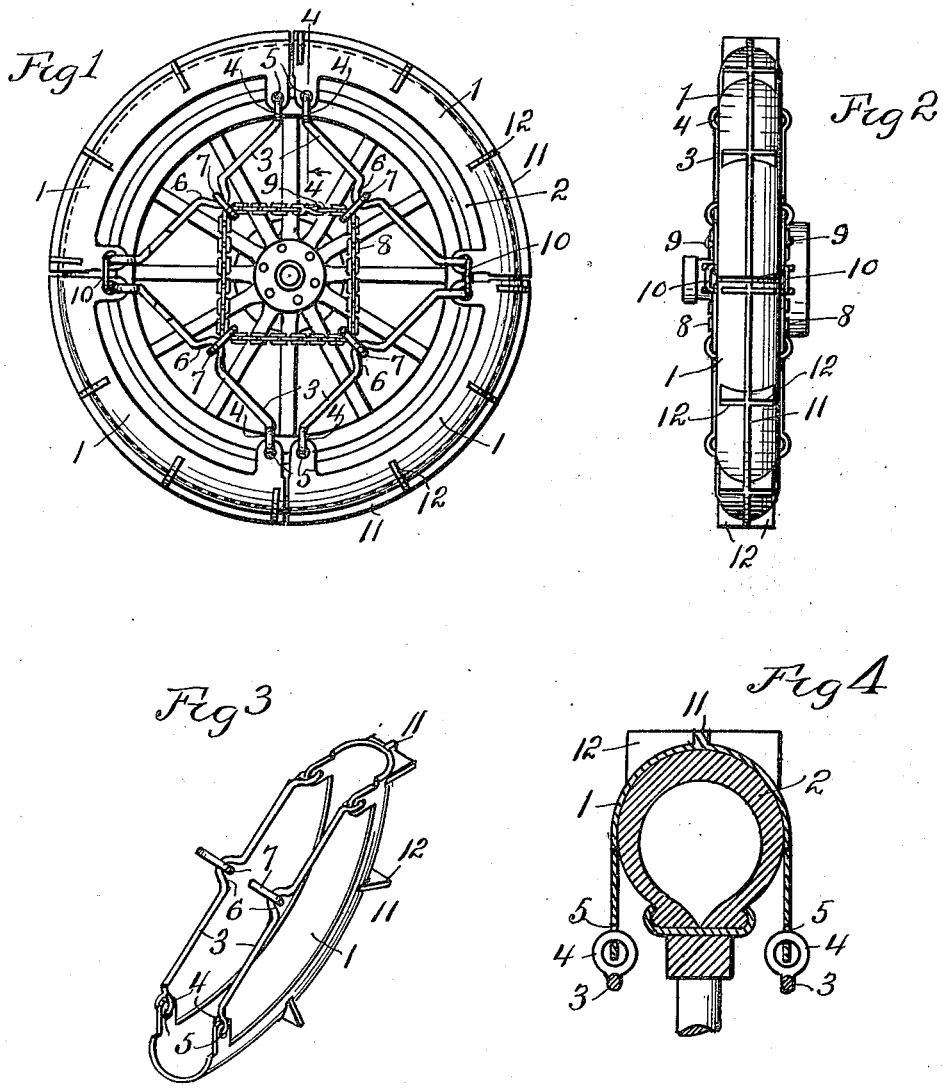
Witness:
R. E. Hamilton
INVENTOR.
George Harford
BY Warren D. House
His ATTORNEY.

Patented May 27, 1924.

1,495,300

UNITED STATES PATENT OFFICE.

GEORGE HARFORD, OF KANSAS CITY, MISSOURI.

TIRE ARMOR.

Application filed March 24, 1923. Serial No. 627,338.

*To all whom it may concern:*

Be it known that I, GEORGE HARFORD, a citizen of the United States, residing at Kansas City, in the county of Jackson and State of Missouri, have invented a certain new and useful Improvement in Tire Armors, of which the following is a specification.

My invention relates to improvements in tire armors. It relates particularly to armors for inflatable automobile tires.

One of the objects of my invention is to provide a tire armor which is simple, strong, cheap to make, not liable to get out of order, durable, easily applied to or removed from a tire, which will protect the tire from wear and puncture, and which will greatly reduce liability of wheel slipping or skidding.

The novel features of my invention are hereinafter fully described and claimed.

In the accompanying drawing, which illustrates the preferred embodiment of my invention, Fig. 1 is a side elevation of a wheel provided with my improved tire armor.

Fig. 2 is an edge elevation of the same.

Fig. 3 is a perspective view of one of the armor sections.

Fig. 4 is an enlarged cross section on the line 4—4 of Fig. 1.

Similar reference characters designate similar parts in the different views.

The armor is composed of a plurality of arcuate sections, each consisting of metal plates 1 arcuate circumferentially and arcuate in cross section, adapted to embrace the periphery of an ordinary inflatable automobile tire 2, and adapted to be disposed end to end thereon.

Each armor section is provided at each side with a chord member 3, which may consist of a bar of metal having loops formed at its ends and designated by 4, which extend respectively through two holes 5 provided in each plate 1 adjacent to its ends respectively. Each chord member 3 is preferably provided with a central inwardly extending recess 6. Rings 7 are respectively mounted on the chord members 3 in the recesses 6.

For connecting the chord members through the rings 7, for holding the armor sections on the tire, there are provided two flexible members, each comprising, preferably a chain 8 which extends through the rings 7 at that side of the wheel, and which is provided with means for releasably fastening together its ends, such as a snap hook 9 which is attached at one end of the chain and is adapted to be engaged with the link at the other end of the chain, or with other links on smaller wheels.

If desired, links 10 may be employed to connect the sections in pairs at each side of the wheel.

To prevent the wheel from skidding, each plate 1 may be provided with a central longitudinal peripheral rib 11. To prevent circumferential slippage, each plate 1 may be provided at opposite sides of the rib 11 with peripheral cross ribs 12.

In applying the armor to a tire, the sections are placed thereon, with the chord members at opposite sides of the wheel, after which the chains 8 are slipped through the rings 7 at the adjacent sides of the wheel, and the snap hooks 9 are respectively engaged with the opposing links of the chains, as is illustrated in Fig. 1. To remove the armor, the operation described is reversed.

I do not limit my invention to the structure shown and described, as modifications, within the scope of the appended claims may be made without departing from the spirit of my invention.

What I claim is:—

1. A tire armor comprising arcuate sections disposed end to end and adapted to embrace the periphery of an inflatable tire, each section having a chord member adapted to be disposed at one side of a wheel supporting the tire, rings respectively mounted on the chord members, and a flexible member adapted to encircle the hub of the wheel and extending through said rings and having its ends attached to each other, substantially as set forth.

2. A tire armor comprising arcuate sections disposed end to end and adapted to embrace the periphery of an inflatable tire, each section having a chord member provided with a central inwardly extending recess, the chord members being adapted to be disposed at one side of a wheel supporting the tire, rings respectively mounted on said chord members and located respectively in said recesses, and a chain adapted to encircle the hub of the wheel and extending through said rings and having its ends attached to each other, substantially as set forth.

3. A tire armor comprising arcuate sections disposed end to end and adapted to embrace the periphery of an inflatable tire, each section having two chord members adapted to be respectively disposed at opposite sides of a wheel supporting the tire, rings respectively mounted on said chord members, and two chains extending respectively through the rings at opposite sides of the wheel, and having means for releasably engaging the rings, substantially as set forth.

In testimony whereof I have signed my name to this specification.

GEORGE HARFORD.